United States Patent [19]

Muller

[11] 4,011,772
[45] Mar. 15, 1977

[54] STEERING WHEEL FOR A MOTOR VEHICLE

[75] Inventor: George H. Muller, Ann Arbor, Mich.

[73] Assignee: Ford Motor Company, Dearborn, Mich.

[22] Filed: Dec. 19, 1975

[21] Appl. No.: 642,642

[52] U.S. Cl. .................................................. 74/552
[51] Int. Cl.² ...................... B62D 1/04; G05G 1/10
[58] Field of Search ........................... 74/552, 491

[56] References Cited

UNITED STATES PATENTS

| | | | |
|---|---|---|---|
| 2,596,784 | 5/1952 | Nagin | 74/552 |
| 2,810,301 | 10/1957 | Mathues | 74/552 |
| 2,814,211 | 11/1957 | Hoagg | 74/552 |
| 2,889,714 | 6/1959 | Romano | 74/493 |
| 3,321,996 | 5/1967 | Cardinale | 74/552 |
| 3,456,526 | 7/1969 | Brilmyer | 74/552 |

*Primary Examiner*—Leonard H. Gerin
*Attorney, Agent, or Firm*—Clifford L. Sadler; Keith L. Zerschling

[57] ABSTRACT

A steering wheel for a motor vehicle according to the present disclosure has a hub, a pair of spokes and a rim with a resiliently flexible core. The rim core comprises a series of stacked leaf spring members, each member being of circular shape in the plan view. The rim core is secured to the spokes by a clamp structure. The spokes and rim core are enclosed in a plastic covering for convenient handling by the vehicle operator. The rim is constructed to resiliently deflect under an impact load whereby a portion of the load is absorbed.

9 Claims, 5 Drawing Figures

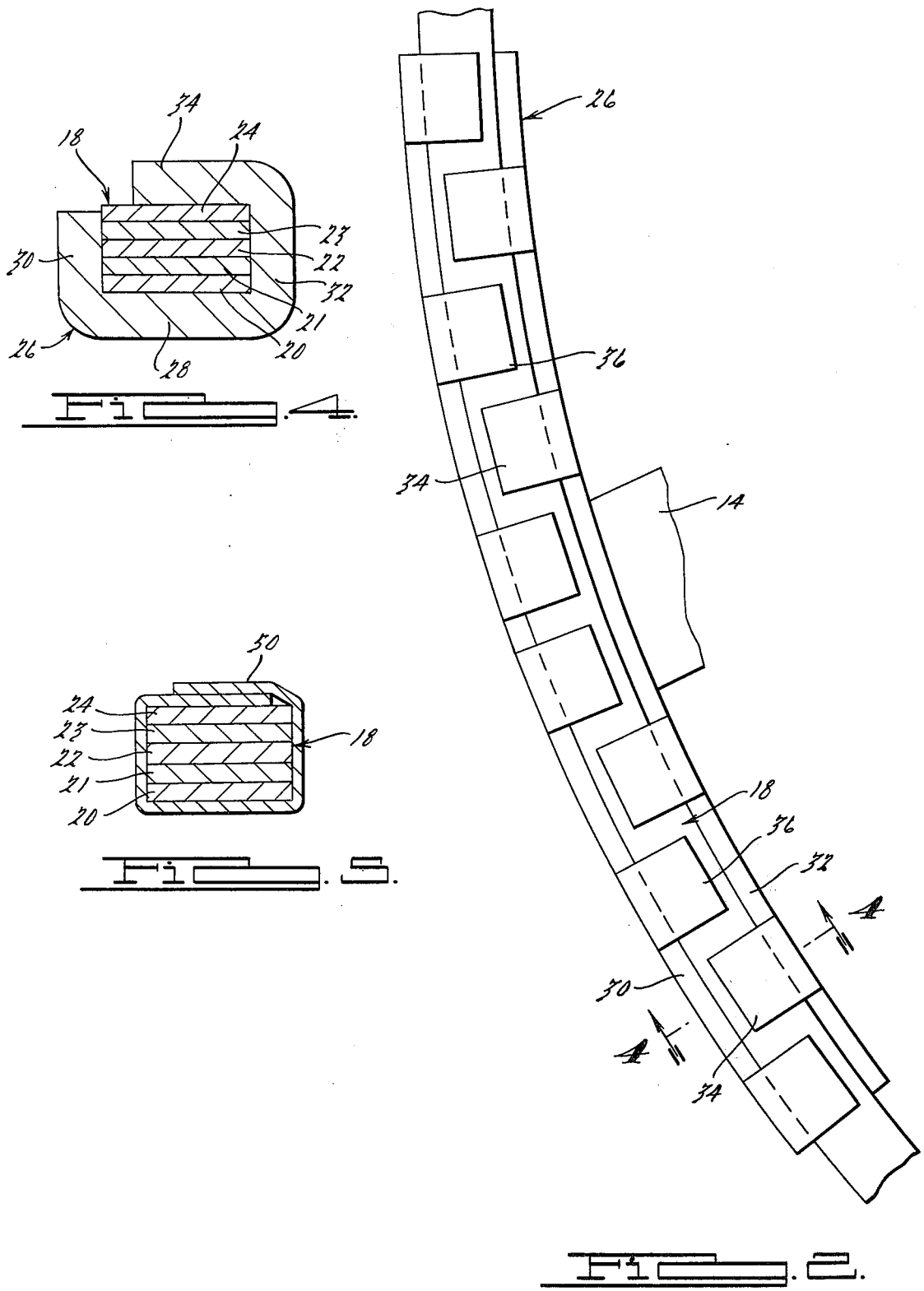

STEERING WHEEL FOR A MOTOR VEHICLE

BACKGROUND OF THE INVENTION

The present disclosure relates to steering wheels for motor vehicles, and more particularly to a steering wheel having a resilient rim that is deflectable under an impact load. Deflection of the rim causes a portion of the load to be absorbed. A steering wheel according to the present disclosure provides an improvement over prior art steering wheels such as shown in U.S. Pat. Nos. 3,221,996 and 3,456,526.

BRIEF SUMMARY OF THE DISCLOSURE

A steering wheel is disclosed having a hub from which a pair of spokes radiate. A rim core is secured to the outer ends of the spokes. The rim core comprises a stack of leaf springs each of which is circular in the plan view and has a flat upper surface perpendicular to the axis of rotation of the steering wheel.

A pair of attachment members which have an arcuate shape in the plan view are welded to the outer ends of the spokes. The attachment members have a channel shape cross section formed by arcuate side walls interconnected by a bottom wall. Tabs are formed along the edges of the side walls. The plurality of circular leaf springs are positioned between the side walls of the attachment members and the tabs are crimped over to clamp the plurality of springs in position. The spokes and rim core are enclosed by a plastic covering to provide a convenient gripping surface for a vehicle operator.

The steering wheel provides a rim which is resiliently deflectable under an impact load imposed upon it in a direction parallel to the axis of the wheel. The rim is rigid with respect to forces in the plane of the rim whereby the rim will not deflect when it is gripped by a vehicle operator and a tangential force is applied for the purpose of rotating the wheel.

BRIEF DESCRIPTION OF THE DRAWINGS

The many objects and advantages of a steering wheel constructed in accordance with this invention will become apparent upon consideration of the following detailed discussion taken in association with the accompanying drawings, in which:

FIG. 2 is an enlarged plan view of the attachment between the rim core and the left steering wheel spoke;

FIG. 4 is a sectional view taken along section line 4—4 of FIG. 2; and

FIG. 5 is a sectional view taken along section line 5—5 of FIG. 1.

DETAILED DESCRIPTION OF PRESENTLY PREFERRED EMBODIMENT

Figure 1:
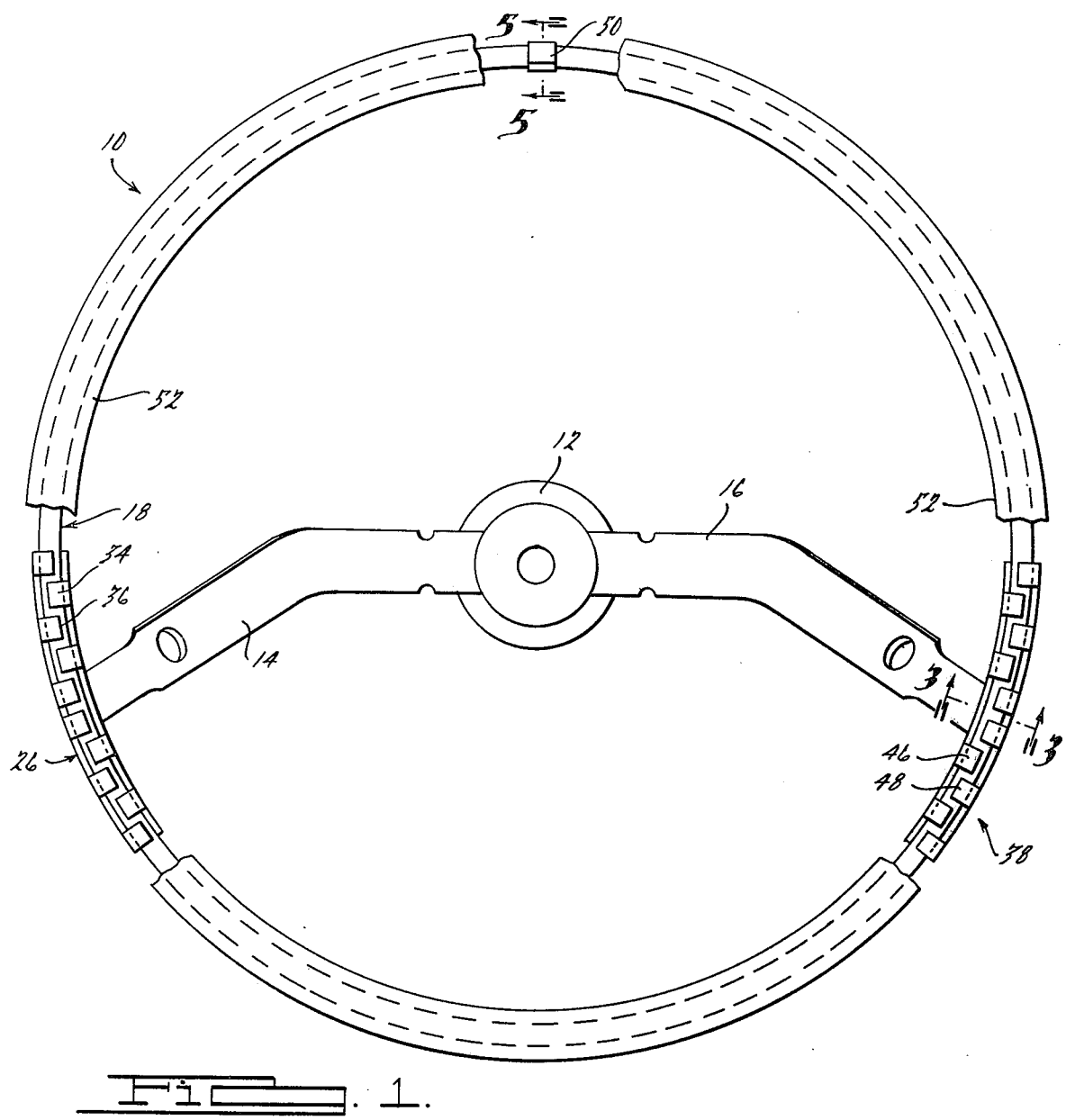
FIG. 1 is a plan view of a steering wheel in accordance with the invention with a portion of the plastic covering removed to show the construction of the rim core and the spokes.
Figure 3:
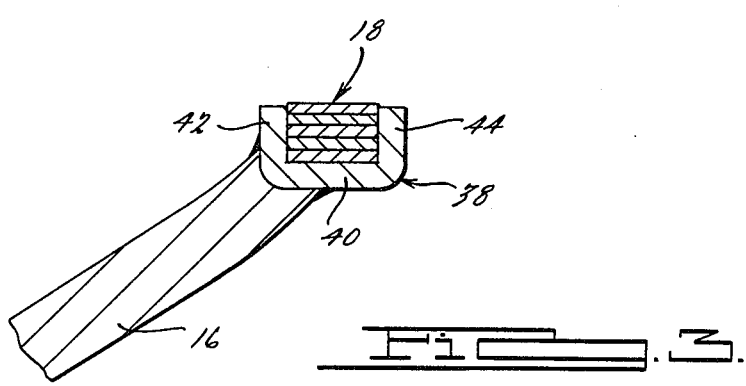
FIG. 3 is a sectional view taken along section line 3—3 of FIG. 1.

Referring not to the drawings wherein the presently preferred embodiment of this invention is illustrated, a steering wheel 10 suitable for use in a motor vehicle is disclosed in FIG. 1. The steering wheel 10 includes a hub 12 that may be attached to a steering shaft. Left and right spokes 14 and 16 radiate from the steering wheel hub 12. The outer ends of the spokes 14 and 16 are angled downwardly in dogleg fashion and are attached to a rim core assembly 18.

The rim core assembly 18 comprises a stack of leaf springs 20, 21, 22, 23 and 24. Each of the springs 20 to 24 is a leaf spring member having a rectangular shape in cross section and a circular annular shape in the plan view. Each of the leaf springs 20 to 24 has a flat upper surface that lies in a plane perpendicular to the axis of rotation of the steering wheel 10.

The means by which the rim core assembly 18 is attached to the spokes 14 and 16 will now be described. A member 26 having an arcuate shape in the plan view and a channel shape in cross section is welded to the outer end of the spoke 14. The channel shape of the member 26 is formed by a bottom wall 28 and arcuate side walls 30 and 32. The stack of leaf spring members 20 to 24 are positioned upon the bottom wall 28 and between the side walls 30 and 32. A row of inner tabs 34 are formed along the upper edge of the inner wall 32. Similarly, a row of tabs 36 are formed along the edge of the outer wall 30. With the stack of leaf spring members 20 to 24 positioned between the inner and outer walls 30 and 32, the tabs 34 and 36, which originally extended upwardly, are alternately bent over in interdigital fashion to provide a clamping force securing the core assembly 18 in the channel shape member 26.

In a similar manner, a channel member 38 is welded to the outer end of the right spoke 16. The channel member 38 comprises a bottom 40 and side walls 42 and 44. Spaced apart tabs 46 and 48 are formed along the upper edges of the inner and outer side walls 42 and 44. The stacked set of leaf springs 20 to 24 are positioned between the side walls 42 and 44 and the tabs 46 and 48 are bent over to secure the leaf springs within the member 38.

A metal band or strap 50 encircles the circular leaf springs 20 to 24 at a location in the middle of the upper half of the rim core assembly 18. The strap 50 serves to hold the circular leaf springs 20 to 24 in position during the manufacture of the wheel.

The wheel 10 of FIG. 1 is fabricated in the following fashion. The hub 12 is machined and spokes 14 and 16 are welded thereto in the relationship shown in FIG. 1. The channel members 26 and 28 are welded to the outer ends of the spokes 14 and 16. The leaf springs 20 to 24 are each formed as a continuous one-piece loop. The springs 20 to 24 are stacked one on top of the other and then encircled by the strap 50. The stacked set of springs 20 to 24 are positioned in the channel members 26 and 38. The tab members 34 and 36 of channel member 26 are crimped over to securely grip the spring leaves 20 to 24 between the side walls 30 and 32 of channel member 26. Similarly, with the spring leaves 20 to 24 positioned between the side walls 42 and 44 of the right support member 38, the tabs 46 and 48 are crimped over into tight gripping engagement with the leaf springs 20 to 24. Because the members 20 to 24 are fabricated from spring steel, the crimping method for attaching them to the members 26 and 38 is advantageous.

The construction of the wheel 10 is completed by enclosing the hub 12 and the spokes 14 and 16 in a decorative plastic cover. The rim assembly 18 and the attachment brackets 26 and 38 are enclosed by a molded in place plastic covering 52 which provides a surface that may be gripped by a vehicle operator.

The steering wheel 10 is characterized by its resiliency in a direction parallel to the axis of rotation of the wheel. If an impact load is imposed upon the rim in a direction parallel to the axis of the wheel 10, the rim will resiliently deflect to absorb a portion of the load. On the other hand, the rim is rigid with respect to forces in the plane of the rim. When the vehicle operator places his hand upon the rim and applies a generally tangential force for the purpose of rotating the wheel 10, the wheel rim will not be distorted.

The foregoing description presents the presently preferred embodiment of this invention. Details of construction have been disclosed for purposes of illustration and are not to be considered as limitations of the invention. Modifications and alterations of the invention may occur to those skilled in the art which will come within the scope and spirit of the following claims.

I claim:

1. A steering wheel for a motor vehicle having a hub, a spoke attached to said hub and a rim core assembly attached to said spoke;
    said rim core assembly comprising a plurality of leaf spring members;
    each of said leaf spring members having a circular shape in the plan view;
    said rim core assembly being resiliently deformable in response to an impact load imposed upon said assembly in a direction parallel to the axis of said steering wheel.

2. A steering wheel for a motor vehicle according to claim 1 and including:
    each of said leaf spring members having a flat upper surface lying in a plane perpendicular to the axis of rotation of said steering wheel;
    said rim core assembly being substantially rigid with respect to a tangential force imposed upon said assembly in a plane parallel to said flat surfaces.

3. A steering wheel for a motor vehicle comprising a hub;
    a left spoke and a right spoke secured to said hub;
    a right attachment member and a left attachment member secured to the outer ends of said left spoke and said right spoke, respectively;
    a rim core assembly secured to said left and right attachment members;
    said rim core assembly comprising a plurality of leaf spring members;
    each of said leaf spring members having a circular shape in the plan view;
    said rim core assembly being resiliently deformable in response to an impact load imposed upon said assembly in a direction parallel to the axis of said steering wheel.

4. A steering wheel for a motor vehicle according to claim 3 and including:
    each of said leaf spring members having a flat upper surface lying in a plane perpendicular to the axis of rotation of said steering wheel;
    said rim core assembly being substantially rigid with respect to a tangential force imposed upon said assembly in a plane parallel to said flat surfaces.

5. A steering wheel for a motor vehicle comprising a hub;
    a first spoke and a second spoke secured to said hub;
    a first attachment member and a second attachment member secured to the outer ends of said first spoke and said second spoke, respectively;
    a rim core assembly secured to said first and second attachment members;
    said rim core assembly comprising a plurality of annular leaf spring members stacked one upon another;
    means securing said plurality of leaf spring members in flush engagement with each other;
    said rim core assembly being resiliently deformable in response to an impact load imposed upon said assembly in a direction parallel to the axis of said steering wheel.

6. A steering wheel for a motor vehicle comprising a hub;
    a spoke secured to said hub;
    an attachment member secured to the outer end of said spoke;
    said attachment member having an arcuate configuration in the plan view and a channel shape configuration in cross section;
    said attachment member having a pair of side walls;
    a rim core assembly having portions disposed between said side walls;
    the edges of said side walls being in gripping engagement with said rim core assembly;
    said rim core assembly being resiliently deformable in response to an impact load imposed upon said assembly in a direction parallel to the axis of said steering wheel.

7. A steering wheel for a motor vehicle according to claim 6 and including:
    said side walls having the tabs formed along the edges of said side walls;
    said tabs being in gripping engagement with said rim core assembly.

8. A steering wheel for a motor vehicle according to claim 6 and including:
    said rim core assembly comprising a plurality of annular leaf spring members;
    each of said leaf spring members having a flat surface lying in a plane perpendicular to the axis of rotation of said steering wheel.

9. A steering wheel for a motor vehicle according to claim 6 and including:
    said side walls having tabs formed along the edges of said side walls;
    said tabs being in gripping engagement with said rim core assembly;
    said rim core assembly comprising a plurality of annular leaf spring members;
    each of said leaf spring members having a flat surface lying in a plane perpendicular to the axis of rotation of said steering wheel.

* * * * *